United States Patent [19]
Goulet

[11] 3,912,031
[45] Oct. 14, 1975

[54] CONVERTIBLE VEHICLE FOR ALL SEASONS

[76] Inventor: Leo Goulet, R.R. No. 2, Montmagny, Quebec, Canada

[22] Filed: June 14, 1974

[21] Appl. No.: 479,423

[52] U.S. Cl. .............................. 180/9.26; 180/25 R
[51] Int. Cl.² .................... B62M 27/02; B62K 5/00
[58] Field of Search.. 180/25 R, 25 A, 9.26, 9.24 A, 180/9.46, 9.3, 5 A

[56] References Cited
UNITED STATES PATENTS

| | | | |
|---|---|---|---|
| 3,193,039 | 7/1965 | Sutton | 180/25 R |
| 3,521,717 | 7/1970 | Coons | 180/25 R |
| 3,638,746 | 2/1972 | Gostomski | 180/25 R |

*Primary Examiner*—Philip Goodman
*Attorney, Agent, or Firm*—Raymond A. Robic; Arthur Schwartz

[57] ABSTRACT

A motor cycle type of vehicle having three wide track wheels in line and steerable front and rear wheel assemblies adaptable to be used on a great variety of terrains and easily convertible to a snowmobile by the application of a traction belt on the rear and intermediate wheels and skis replacing the front steering wheel. The rear traction wheel has a novel suspension which permits coupling it with the front steering wheel to facilitate turning of this wide track vehicle and to prevent its tripping over in curves.

3 Claims, 9 Drawing Figures

CONVERTIBLE VEHICLE FOR ALL SEASONS

This invention relates to a motor cycle capable of transporting comfortably three to five persons.

It is an object of this invention to provide a wide track vehicle of the motor cycle variety capable of travelling on a great variety of terrains; such as hard and soft grounds, dry or wet, muddy or sandy, snow and ice covered.

It is an other object of this invention to provide a motor cycle of the three wheels in line of the wide track variety capable of turning easily on all sorts of terrains.

An other object of this invention is to provide a novel motor cycle of great stability on wet or slippery surfaces.

An other object of this invention is to provide a three wheel wide track motor cycle capable of being adapted to a snow mobile by the installation of a traction belt to the rear and intermediate wheels and substitute skis for the front steering wheel.

An other object of this invention is to provide a three wheel wide track motor cycle having a unit rear wheel steering device and suspension system capable of assuring maximum manoeuvrability, stability and riding comfort.

These and several other objects of this invention will be best understood upon studying the following specification in conjunction with the drawings in which.

Figure 1:
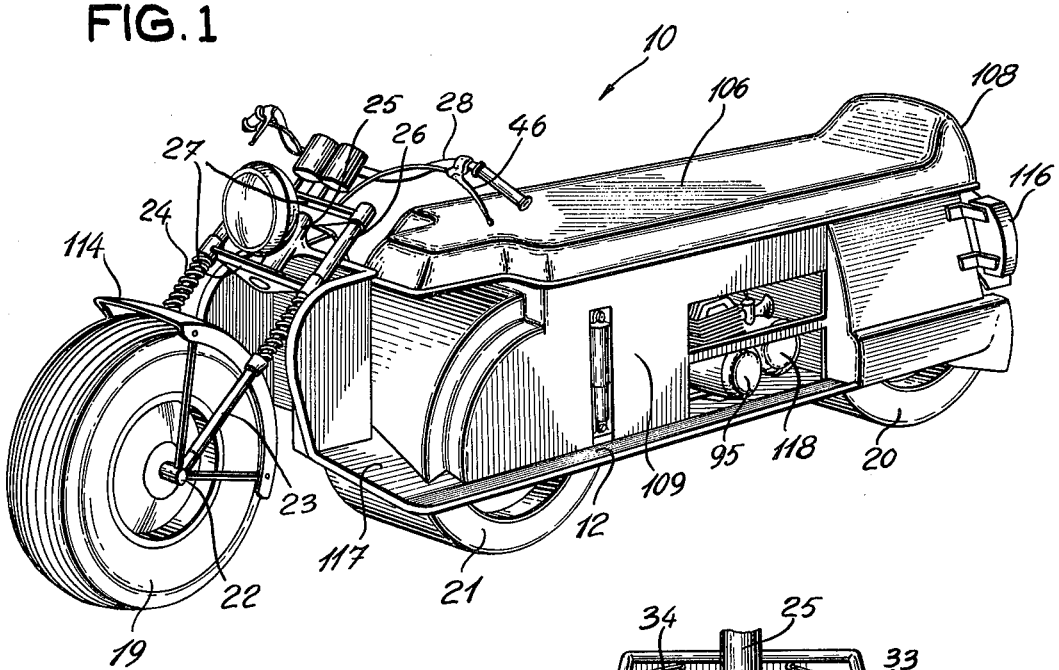
FIG. 1 is a perspective view of the novel vehicle with front steering wheel.
Figure 4:
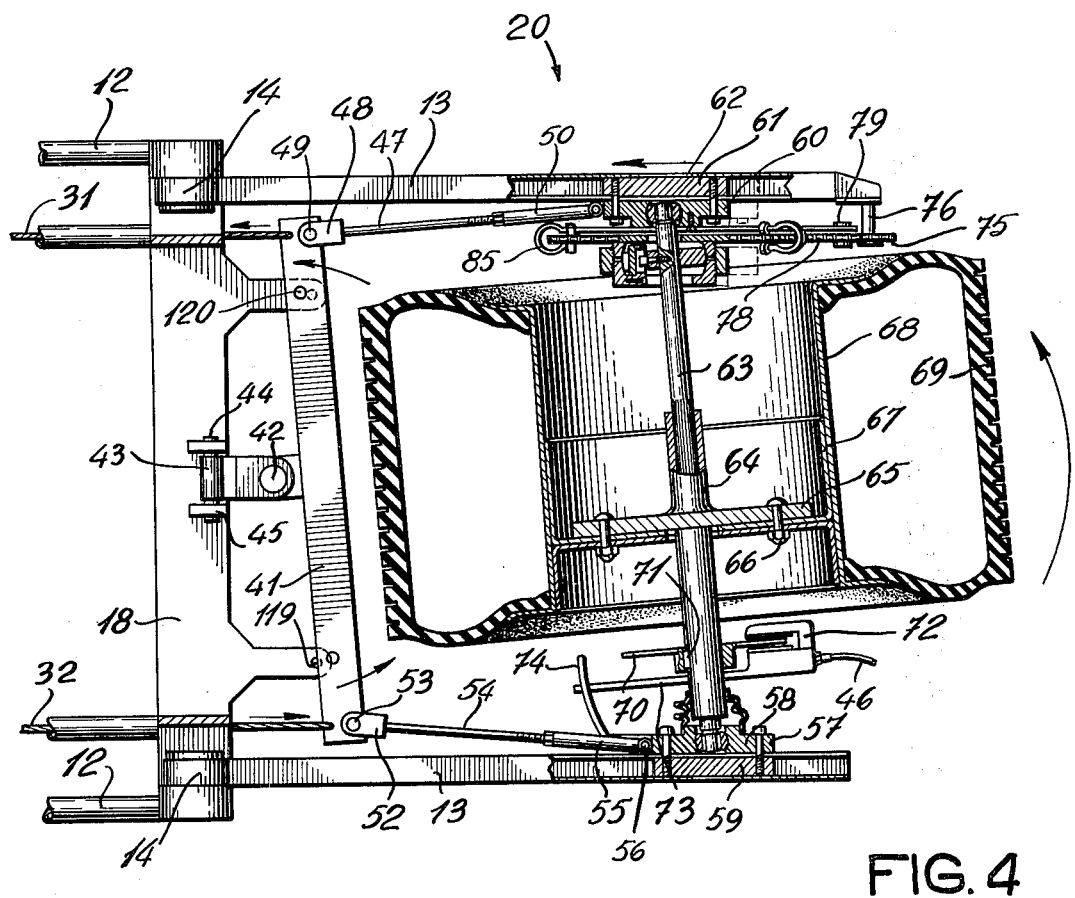
FIG. 4 is a partial enlarged plan view and section of the rear wheel traction, suspension and steering device.

Referring now to the drawings, FIG. 1 shows the three-wheel wide-track motorized vehicle 10 having a standard front motor cycle steering wheel 19 an intermediate or middle wheel 21 and a rear traction wheel 20, all suspended from a rectangular box like frame made up of an upper flat bar section 11 and a lower tubular frame 12 arranged so as to provide a recess or bay at the front end to accomodate the steering wheel and its mounting bracket 25. The upper frame 11 and lower frame 12 are rigidly interconnected by four vertical side struts 16. The rear traction wheel assembly 20 (FIG. 4) is suspended from frames 12 and 11 by a pair of extended beams 13 and pivots 14 on the lower frame 12 and to upper frame 11 by means of pinned shock absorbers 15 and pivots 100. The lower frame 12 has cross bracing 17 which acts also as mounting for motor 95 and transmission 118. The intermediate or middle wheel 21 is suspended to the lower frame 12 by its axle 96 and levers 97 pivoted at joints 98, levers 97 being connected to upper frame 11 by shock absorbers 15 pivoted at 100. The pivoted levers 97 are guided at their front ends by slotted guides 99 rigidly held to the lower frame 12, said frame provides also the side and front foot rests 117 required by the passengers and the driver. FIG. 1 shows the body 109 covering the frame and rear body struts 38, the passenger and driver seat 106 made of resilient and weather resistant material sits partly on the fuel reservoir 107 accessible by a hinged door 108 at the rear of seat 106 as shown on FIG. 5. FIG. 1 shows a standard motor cycle steering wheel 19 rotatably mounted on its axle 22 held by twin male telescopic posts 23 sliding into two female posts 26 joined together by the usual support forks 27 rotatably mounted in support bracket 25 rigidly held by the front tubular frame 12 in the steering wheel bay 37. Helical compression springs 24 act as shock absorbers and a standard mud guard 114 is also provided and supported on the wheel hub of axle 22. To facilitate turning the rear wheel assembly 20 turns with the steering wheel 19 and to that effect steering bracket 27 has two steering cables 31 and 32 attached thereon so that the rear wheel assembly 20 will help steer the vehicle in the directionn of turning. FIG. 4 shows a left hand turning whereby cable 31 pulls on the tee bar 41 in an anticlockwise direction, said T bar being pivoted at 42 and hinged at 43 by pin 44 and a pair of lugs 45 located on cross member 18 itself pivoted at 14. The rear wheel is therefore free to turn right or left or up and down around pivoted connection 42 and 43. The tee bar member 41 being connected to the front steering wheel by means of direction cables 31 and 32. Tee bar 41 is also connected to rear wheel axle assembly by means of a pair of adjustable tie rods 47 and 54 and hinges 49 and 53 by means of forked links 48 and 52. Extended beams members 13 pivoted at 14 to the lower frame 12 are hollow and slotted at their extremities to accomodate sliding bearing blocks 58 and 61 bolted to bearing flanges 57 and 60 pivotally connected to adjustable tie rods 50 and 55 pinned at 51 and 56 to said bearing flanges. Bearing flanges 57 and 60 are individually bolted to the bearing blocks 61 and 58 and slide along the slots in the extended beam frames 13. The rear axle spherical bearings 59 and 62 are held in bearing blocks 61 and 58 and can assume the angularity of the rear wheel axles 63 and 64 as directed by the front steering wheel 19 through cables 31 and 32.

Figure 6:
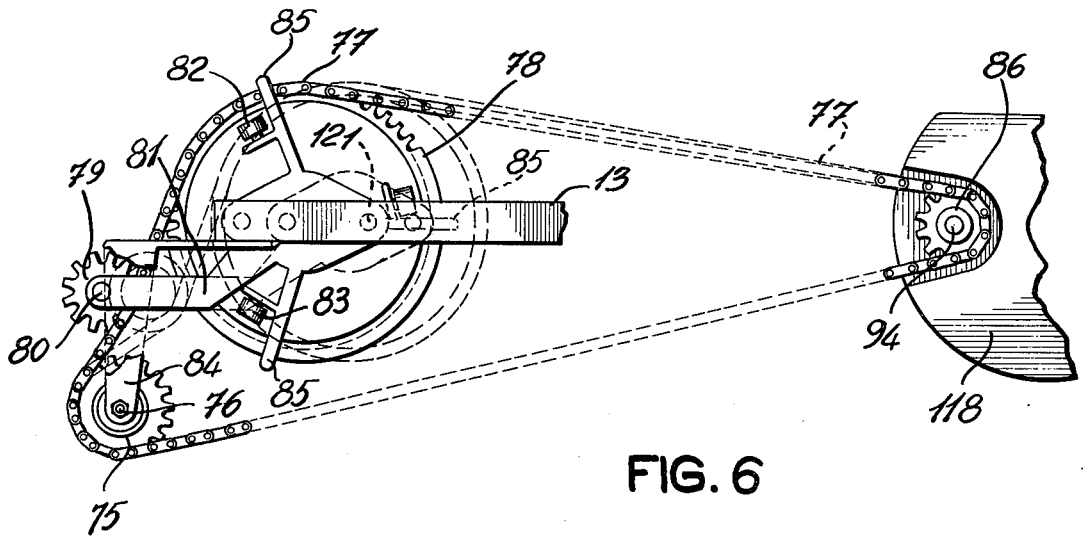
FIG. 6 is an enlarged side elevation of the rear wheel novel traction device.
Figure 8:
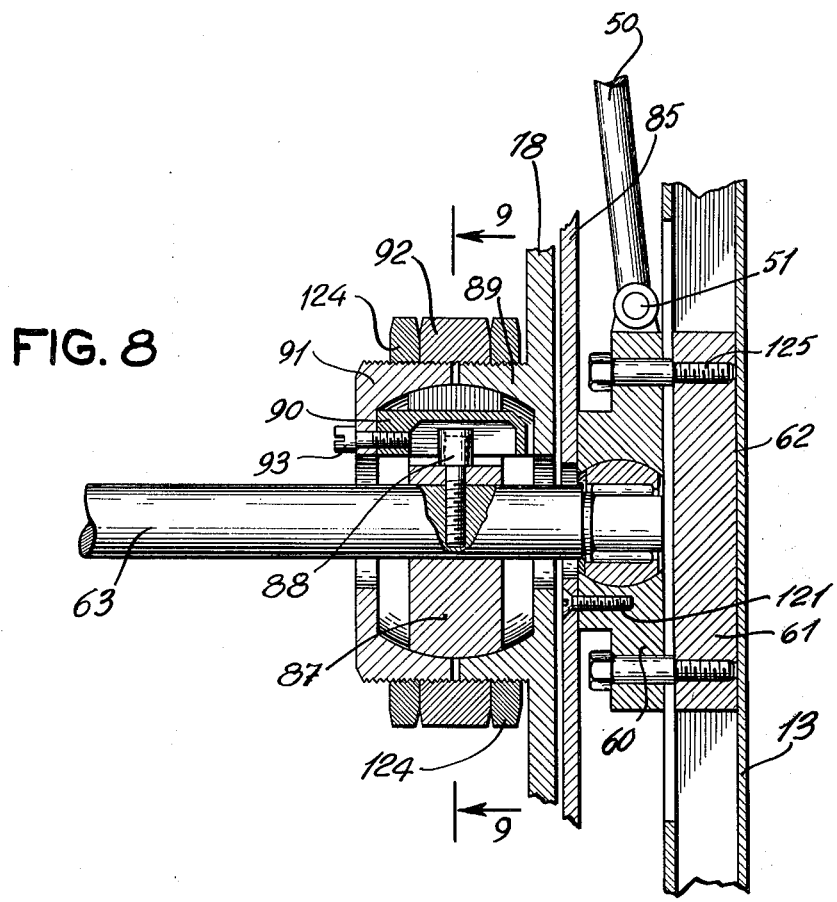
FIG. 8 is an enlarged view of the novel rear sprocket wheel, driving device.
Figure 9:
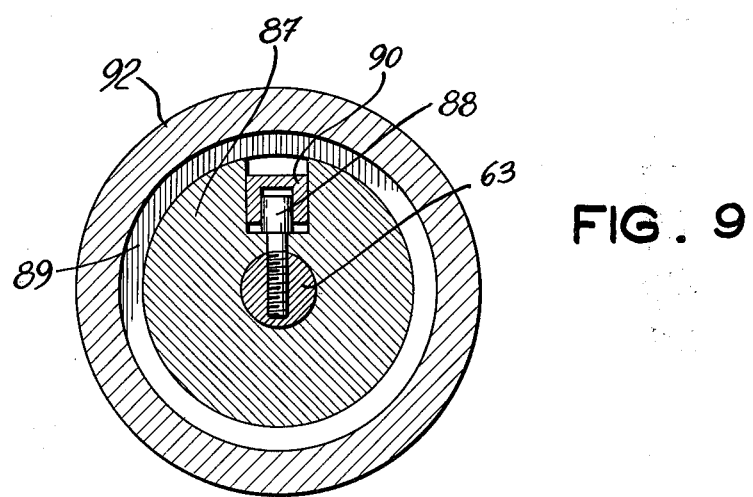
FIG. 9 is a vertical section of FIG. 8 along lines "1—1".

The rear axle assembly 20 consists of a wide track tire wheel 69 mounted on a rim 68 pressed on the wheel drum 67 riveted or held to axle flange 65 part of internally splined female telescopic shaft 64, male telescopic shaft 63 is splined into female telescopic shaft 64 and carried the driving sprocket wheel 78 with sprocket guide 85 (FIGS. 6, 8 and 9). Sprocket wheel 78 has a threaded hub in two parts 89 and 91 assembled by a threaded collar 92, which enclose the connecting means of said sprocket wheel 78 to the rear axle 63, said connecting means comprising a cap screw 88 threaded into axle 63, said cap screw 88 being driven by special adapted 90 fitted inside the spherical collar 87 which is retained by the outside hub 91 by cap screw 93, said part of the hub 91 being retained and driven by sprocket wheel 78 by means of a special sprocket wheel hub 89 welded to sprocket wheel 78, hub 89 and 91 being assembled by means of a screwed on collar 92 and lock nuts 124. When the rear wheel is turned, axle 63 turns and rotates its driving means inside sprocket wheel hubs 89 and 91 without affecting the angularity of sprocket wheel 78. Both axles 63 and 64 are free to assume the angularity required by the steering means in their spherical bearings 62 and 59.

The rear wheel axle 64 has a disc brake, the discs 70 of said brake being keyed to the axle by sunk key 71 and brake shoes 72 operated by the brake cable 46 connected to the steering handle 28. The brake has an extension lever 73 which is prevented from turning with the axle by a curved fork holder 74 held rigidly to the left hand pivoted extended beam 13.

The rear axle 63 has novel chain traction means as shown in FIG. 4 and 6 driven by the motor transmission 118 the sprocket 86 being rotably mounted on the axle 94 and meshing with transmission roller chain 77 wrapped around sprocket wheel 78 and idler sprocket wheels 79 and 75, idler 79 is rotably held in bracket 81 by means of idler shaft 80, while idler 75 is rotably held by bracket 84 by means of idler shaft 76. Bracket 84 is rigidly mounted on the right hand extended beam 13, while bracket 81 is part of the chain guard 85, said chain guard being held on sliding bearing flange 60 by means of screws 121. Chain guard 85 has 6 rollers 82 mounted equidistantly on said bracket by pins 83 and capable of rolling against the face of sprocket wheel 78 so that said sprocket wheel may always be in line with the driving sprocket 86 of the transmission.

Figure 7:
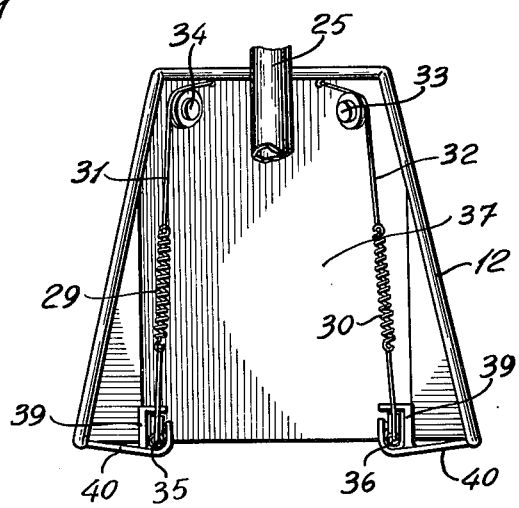
FIG. 7 is an enlarged view of the front bay of the motor cycle for accomodating the steering wheel.
Figure 2:
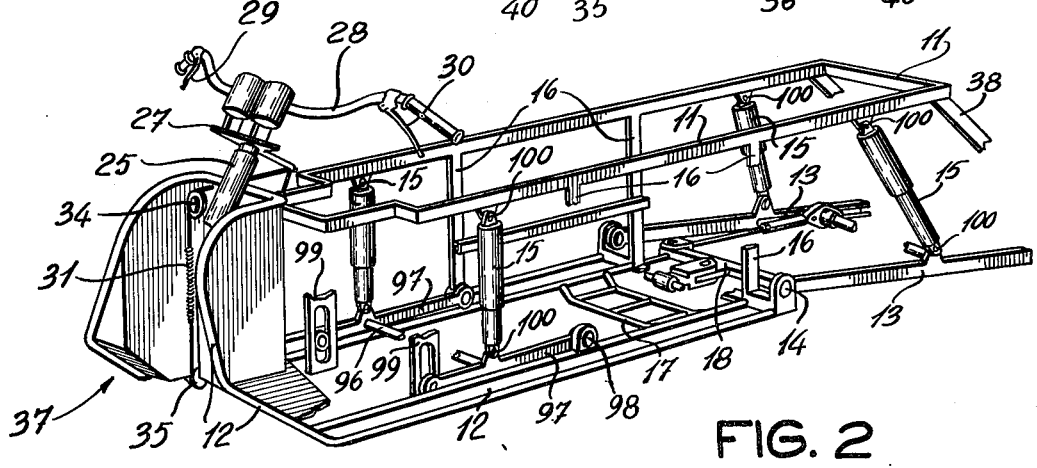
FIG. 2 is a perspective view of the novel body chasis and suspension with part of the body configuration removed.
Figure 3:
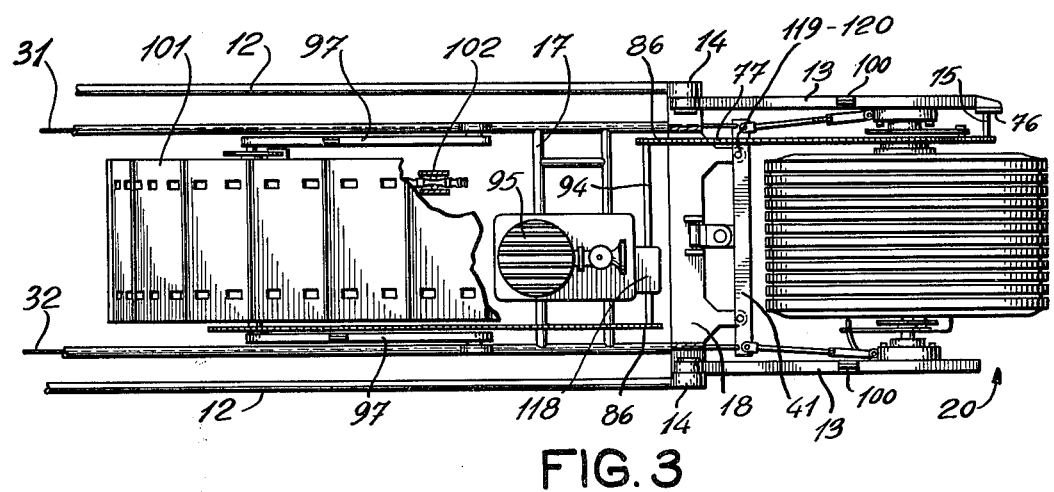
FIG. 3 is a partial plan view of the vehicle with body configuration removed to show the traction belt of the converted cycle.
Figure 5:
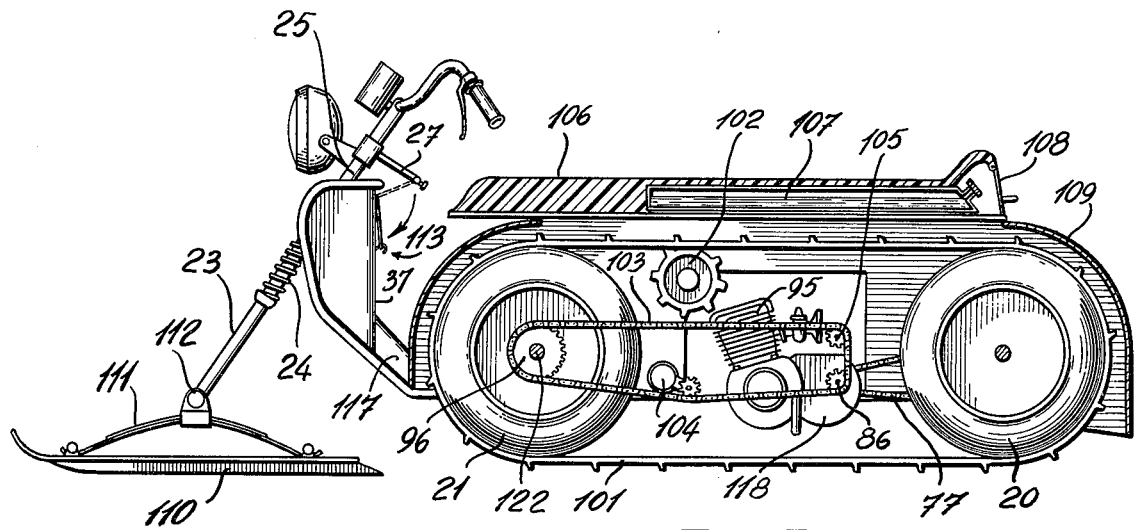
FIG. 5 is an elevation of the converted cycle to snow mobile with side body removed.

Rear wheel steering means consisting of cables 31 and 32 attached to the fork bracket of the steering wheel 27 and to the Tee bar 41 (FIGS. 1, 4 and 7) said cables riding respectively on upper pulleys 34 and 33 located in the upper part of the steering bay 37 and on lower pulleys 35 and 36 located in the lower part of said bay and held by lower frame bracings 39 and 40. Cables 31 and 32 have respectively helical tension springs 29 and 30 (FIG. 7) as part of them so as to pull back the shortened cable when turning. To convert the land vehicle (FIG. 3) to a snow vehicle the front wheel 19 is replaced by skis 110 pivotally attached to the steering posts 23 and 25 by pivot 112 and helical spring shock absorbers 24 and leafs springs shock absorbers 111. The steering cables 31 and 32 are no more required and are detached from the steering fork bracket 27 and attached the hook 113 located at the front of the vehicle as shown in FIG. 5 and an endless track 101 is installed on the middle wheel 21 and the rear wheel 20, both wheels being driven by roller chains 77 and 103, by sprockets 86 rotably mounted on transmission shaft 94. Roller chain 77 drives the rear wheel sprocket 78 and the roller chain 103 drives sprocket 96 mounted on the middle wheel axle 122 and is maintained taut by idler chain sprockets 104 and 105. The endless track 101 is guided and maintained taut on its slack upper side by two idling wheels 102 rotably held to the upper frame 11 by brackets 123.

The rear wheel steering tee bar 41 is locked in its normal neutral position by pins 119 driven into holes 120 in both the tee bar 41 and cross brace 18 as otherwise the endless track 101 would ride off the wheels 20 and 21.

The vehicle is of course provided with the usual standard equipment such as head light 25 and rear lights 116 and various other instruments such as speedometer and motor revolution counter and mud guard.

This describes my invention what I claim as new is as follows.

1. A three wheel in line wide track vehicle of the motor cycle variety easily convertible to a snow vehicle capable of transporting at least three passengers comprising:
   a. a torsion resistance elongated rectangular frame
   b. engine means transversally mounted on said frame and coupled to the rear wheel to effect rotation
   c. a seat mounted on top of said frame capable of accomodating the driver and other passengers having their legs straddles about the sides of said frame
   d. three parallel axes transversally suspended from said frame by shock absorbing and dampening means
   e. a steering mechanism movably mounted on the forward end of said frame and adapted to control the direction of the vehicle
   f. a rear traction wheel having steerable means coupled to the front steering mechanism
   g. a rear traction wheel having braking means operated from said steering mechanism
   h. said front steering means including a steering column secured to said frame
   i. a handle bar rotably carried in said steering column and having steerable means connected to said rear traction wheel
   j. an intermediate wide track wheel the axle of which is pivotally mounted on the lower frame with vertical guides and shock absorbing and dampening means
   k. an open rear end frame pivotally connected to the lower tubular frame and suspended from the upper frame by shock absorbing and dampening means so to permit said wheel to rise up and down to follow the ground profile
   l. a pair of open slotted members pivotally suspended from the lower end frame to provide means for varying the angularity of the transversally suspended rear axle to facilitate the turning of the vehicle.
   m. rear wheel steering means pivotally connected to the rear end frame and the rear wheel axle spherical bearings to effect turning of said wheel
   n. rear wheel steering means comprising a pair of direction cables attached to a pivoted T bar adjustably connected to the spherical bearing flanges, tie connections and fork rods, said T bar being pivotally connected to the rear end lower frame
   o. resilient means attached to the direction cable for maintaining tautness
   p. rear wheel roller chain driving means coupled to the motor transmission sprocket capable of maintaining alignment of said chain with said sprocket independantly of the angularity of said rear wheel
   q. rear wheel axle comprising two splined telescopic sections, a wheel drum and disc brake attached to the female section, and sprocket driving means attached to the male section
   r. spherical bearing in which the rear wheel axle sections are rotably suspended and slidably retained in the slotted extended rear end members and bolted to the respective steering flanges
   s. brake retention means attached to the rear extended member to prevent the rotation of said disc brake
   t. rear wheel traction chain guiding means attached to the male telescopic shaft spherical bearing flange comprising roller means riding on the face of said sprocket and means to maintain said traction chain in contact with the toothed circonference of said sprocket u. traction chain tightness maintaining means comprising a pair of idlers, one rotably attached to the extended slotted member supporting the main driving sprocket and a displaceable idler rotably suspended from the chain guide so as to maintain tautness with the movement of the sliding spherical bearing due to variation in angular displacement of the rear wheel.

2. Means for converting said three wheel vehicle as per claim 1 into a snow vehicle comprising a. a flexible endless belt trained about the rear traction wheel and the intermediate wheel so that the lower tread portion thereof engages with the ground surface, and means for uncoupling the steering means of said rear traction wheel from the front steering means b. means for locking said rear traction wheel steering means in neutral position c. engine driving means located about midway between the rear end and the intermediate traction wheels comprising a rotable shaft d. toothed sprocket gears means fixed at each end of said engine shaft e. toothed sprocket gears means rotably mounted on the axles of the rear and intermediate wheels connected by driving chains to the engine driving shaft f. a ski or pair of skis positioned ahead of said endless belt and in logitudinal axis therewith g. a ski steering device pivotally attached to said ski or skis including a steering column attached to said frame h. shock absorbing and dampening means mounting said ski or skis to the steering means.

3. A three wheel convertible vehicle as per claim 2 in which the frame comprises a rigid rectangular construction made of flat bar right and left side upper horizontal elements and a lower right and left side tubular horizontal elements secured to the upper part by welded vertical and horizontal flat bar struts.

a. a front head tubular element forming a bay for the steering means and said lower frame opened at the rear to receive and pivotally suspend the rear traction wheel b. rear end frame members pivotally suspended on the lower part of the frame and slotted to slidably receive the rear wheel spherical bearings c. the lower and upper horizontal part of the frame having lugs to pivotally receive the intermediate and rear wheel shock absorbing and dampening means d. the lower tubular frame having lugs to pivotally suspend the intermediate wheel axle e. the lower tubular frame having slotted guides welded thereon to pivotally guide up and down the intermediate wheel f. the lower rear end of the tubular frame being terminated by a cross member having lugs welded thereon to pivotally receive the two rear slotted frame members and having lugs to pivotally suspend the rear wheel steering T bar.

g. a fuel reservoir straddled and removably fixed to the upper part of the frame h. a body forming sides, front and rear bolted to said upper and lower part of the frame.

* * * * *